April 28, 1936.   W. SCHULTE   2,039,263
PROCESS FOR THE MANUFACTURE OF BANDS, THREADS AND THE LIKE
Filed Feb. 7, 1934
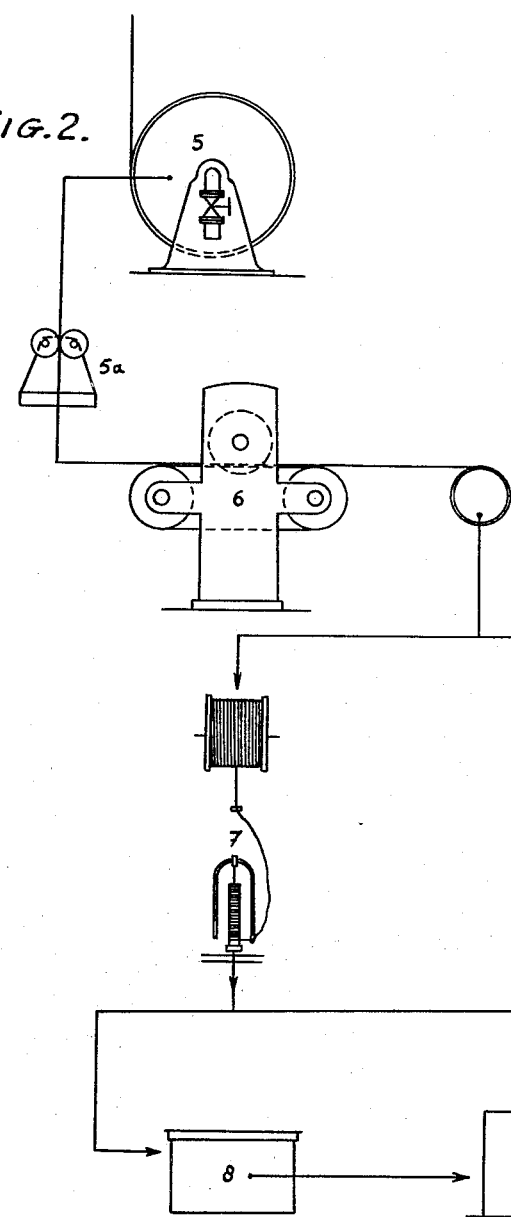
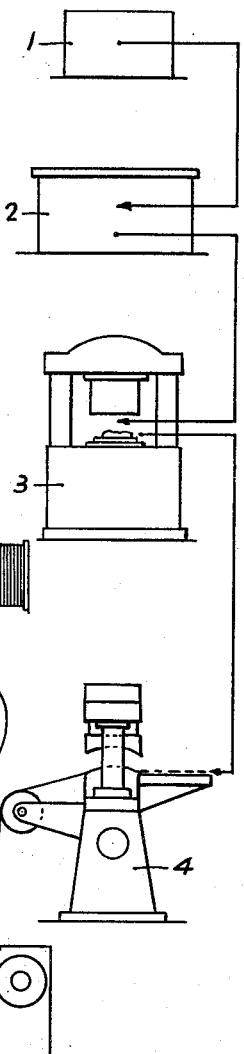
Inventor:
Wilhelm Schulte
By
Attorney Patented Apr. 28, 1936

2,039,263

UNITED STATES PATENT OFFICE 2,039,263

PROCESS FOR THE MANUFACTURE OF BANDS, THREADS, AND THE LIKE

Wilhelm Schulte, Meppel, Netherlands, assignor to N. V. Koninklijke Pharmaceutische Fabrieken v/h Brocades-Stheeman & Pharmacia, Meppel, Netherlands, a limited-liability company of the Netherlands Application February 7, 1934, Serial No. 710,185
In the Netherlands February 11, 1933

12 Claims. (Cl. 117—2)

This invention relates to a process and apparatus for the manufacture, from collagenous or elastin-containing animal fibres or materials containing the same, of bands, for use in the production of membranes and the like, and of threads, suitable for use as surgical suture material, strings for violins, rackets and the like.

For the purpose of stitching up wounds, for example incisions effected during operations, surgeons employ a special suture material, which serves the purpose of keeping the edges of the wound together until the latter is healed. For deep sutures a material is employed, which is reabsorbed by the organism after a certain time. Reabsorbable suture material has the great advantage that it gradually disappears and need not, therefore, be removed from the stitching channels when the wound is healed.

Hitherto a suture material, prepared by a very complicated process from intestines, has been almost exclusively employed, the starting material being the intestine, or more exactly the small intestine, of the wether, from which a suture thread about 2½ metres long suitable for operation purposes can be prepared.

In England, where such a material was for the first time prepared, the name "catgut" has been applied thereto.

The starting material for the preparation of such catgut, i. e. the intestine, is very impure, since it contains a large number of harmful micro-organisms distributed over the entire mass. The intestine must first be freed by very troublesome and complicated operations from its unserviceable outer layers before the layer, which alone can be used for the purpose in view, i. e. the submucosa, is exposed. This layer is then sterilized and the finished thread prepared by twisting.

There is, however, no absolute guarantee that intestinal catgut really satisfies the requirement of surgery of being absolutely sterile. It is constantly being demonstrated by means of the most exact bacteriological researches, particularly those applying modern bacteriological culture processes, which in recent years have made very considerable progress, that the said catgut is not entirely sterile.

Famous surgeons, for instance Fritsch and Payr, have to a large extent abandoned or curtailed the use of intestinal catgut owing to the uncertainty of complete sterilization.

It is, however, impossible entirely to dispense with catgut, not only because it can be reabsorbed but also because it is the only available homœoplastic suture material.

A further disadvantage of intestinal catgut is that its tensile strength is not always sufficient to prevent stitches from being broken and sutures from being ruptured and the like.

A substitute for intestinal catgut has, therefore, been sought for many years and it was thought that this had been found in animal fibres, such as sinews, flesh and the like, which are in themselves free from, or relatively free from, germs and can be easily sterilized. This starting material is separated into fibres and thereafter spun in the manner usually employed in the textile industry, the different operations being carried out under aseptic conditions or the finished products being sterilized. Not only is surgical suture material obtained in this manner, but also strings for violins, rackets and the like.

Great difficulties were, however, met in the application of this process. Rational production was not possible, because the resulting threads were unsatisfactory in quality. This is proved by the fact that reabsorbable surgical suture material is even now being exclusively manufactured from wether intestines.

According to this invention it has been found that bands, if desired endless bands, of high quality, which can be worked up either to membranes and the like, or to threads, suitable for use as surgical suture material, strings for violins, rackets and the like, can be manufactured from collagenous or elastin-containing animal fibres, or materials containing the same. For this purpose the starting material is first loosened in a suitable solution and thereafter pressed into thin sheets; these sheets are then laid upon one another in such a way that they partially overlap one another and the entire mass is thereafter pressed out into a band. If material, such as true skin or corium, is employed as starting material, from which pieces of sufficient length can be prepared, it is of course not necessary first to press the material into sheets and to superimpose them in such a way that they overlap one another, but the material, after treatment in the liquid, can be directly pressed out into a band. The bands can be worked up into membranes.

If it is desired to manufacture threads from the bands, the latter are preferably slightly dried, if necessary again pressed to the desired thickness, the bands divided into strips of the requisite width and threads prepared from these strips in the manner usually employed in the textile industry, by twisting together and, if desired, doubling.

If the products are to be used for surgical purposes or for other purposes, for which sterility is necessary or desired, the starting material can be removed from the body of the animal under sterile conditions and be further worked up under aseptic or antiseptic conditions. If it is not desired or possible to take these precautionary measures, the resulting products can, of course, also be sterilized at any desired stage of the operation and the further treatment be carried out under sterile conditions or, alternatively, the finished products may be sterilized. For many technical purposes sterilization is, of course, not necessary.

Woven fabrics may also be manufactured from the threads and these may, if desired, be impregnated with chemicals. The threads themselves may also be subjected to such a treatment, thus, for example, the threads may be loaded with cumene or iodine. It is further possible to manufacture coloured products, which may, for example, be used as ornamental threads for rackets.

An apparatus suitable for carrying out the process according to this invention is illustrated in the accompanying diagramatic drawing, in which the initial parts of the apparatus are represented in Fig. 1 and the succeeding parts in Fig. 2.

Referring to the drawing, I represents a supply vessel for the starting material, 2 a vessel in which the loosening of the starting material is effected, 3 a press for pressing the loosened material into thin sheets, 4 a press for pressing out the superimposed sheets from 3 into a band, 5 a heating drum, 5a a pair of hard rubber rollers, capable of adjustment, for compressing the band issuing from the heating drum 5, 6 a cutting device for cutting the compressed band into strips, 7 a twisting device for twisting the strips into threads, 7a a doubling device, which may be employed instead of the twisting device 7 when it is desired to twist several individual threads into one combined thread, 8 a vessel for effecting further treatment, for example tanning, of the twisted threads from 7 or 7a and 9 a drying device.

In the above described apparatus the presses, for example hydraulic presses, 3 and 4 may be replaced by rollers.

The following example serves to illustrate how the process of this invention may be carried into effect:

Collagenous or elastin-containing fibres are employed as starting material, since these impart the requisite strength and other special properties, which are necessary for the various purposes of application, to the finished products. These collagenous and elastin-containing fibres in their original condition are surrounded by proteins, which hold the fibres together in the form of fibre bundles, which are capable of offering great resistance to mechanical influences. Thus, for example, a pressure of about 200 atms. is necessary for sinews, in order to press them out to a width, equal to three times the diameter of the sinews in their original condition.

In view of the foregoing it is necessary, before subjecting the starting material to the several treatments hereinbefore referred to, first to loosen the same, in order to reduce the cohesion between the individual fibres and to render the material better capable of being pressed. For this purpose a suitable liquid, for example a dilute solution of acid, or other compound, which has an acid reaction in an aqueous medium, such as a rivanol solution of the desired concentration, may be employed.

The starting material is either directly introduced, after its removal from the body of the animal, into the vessel 2 or conveyed from the supply vessel I, in which it may if desired be stored in an aseptic or antiseptic liquid until required for use.

If necessary, a portion of the liquid is removed after the loosening process, for example by centrifuging. A residual liquid content of 30 to 40% in the fibres has, however, proved to be very advantageous.

The material is thereafter pressed into sheets or discs in the press 3. In this way thin sheets are obtained, which, as a rule, are less than 1 mm. thick. In these sheets the fibres lie in a longitudinal direction, a fact which is very advantageous for the purpose in view.

The individual sheets or discs are thereafter so superimposed that the ends of the several sheets overlap one another, after which the mass is again strongly pressed in the press 4.

The results of the foregoing operations are as follows:

1. Several individual sheets of material are combined into one band. If desired, an endless band may be produced.

2. The fibres of the individual sheets are intimately joined together owing to the fibres being pressed into, and between, one another at the points at which they overlap.

The glutin contained in the material promotes the close union of the individual sheets in a favourable manner.

The thickness of the band of material is substantially decreased, for example to 0.5 mm. or even less, by the second pressing or rolling process.

If it is possible to cut sufficiently long pieces from the starting materials, for example true skin or corium, the steps of superimposing and second pressing may, if desired, be omitted.

Bands of material of the aforesaid kind and thickness may be employed, after suitable further working up and chemical treatment (for example tanning), for the manufacture of membranes and the like. If the bands of material are to be used for the manufacture of membranes and the like, which have to fulfill particularly stringent requirements with regard to strength and resistance in all directions to pull, several bands of material must be so superimposed and pressed or rolled together that the fibres of the individual bands are disposed at an angle, for example a right angle, in relation to the fibres in the bands immediately below or above. It is not necessary to employ a special agent for fixing or gluing the individual layers close together, because the glutin contained in the material constitutes an excellent binder for the purpose.

For the manufacture of certain threads, for example for surgical purposes, however, these bands of material, having a thickness of 0.5 mm., are still too thick. In order further to reduce the thickness, the bands of material are first pre-dried, for example on the heating drum 5. The temperature of the drying device must be well regulated, in order to prevent the material from being damaged by the heat. The material must, moreover, not be completely dried, since a certain moisture content is necessary for the further operations. A moisture content of between 20 and 30% on leaving the drying device, has proved to be very suitable.

After drying, the band of material is again pressed, for example between the pair of hard rubber rollers 5a. The band of material is brought by this operation to a uniform, exactly adjustable thickness, for example to 0.06 mm. without tears or holes appearing in the thin band.

If, on the other hand, it is desired to manufacture threads, which need not be so uniform and may, if necessary, be thicker, for example racket strings, the pressing process following the pre-drying may be omitted.

The band of material is then cut into strips in the device 6, for example by passing the band between endless conveyor belts under a cutting roller, provided with a corresponding number of rotating knives.

The width of the individual thin strips of material is selected in accordance with the required thickness of the threads to be prepared from the strips.

The strips, obtained in this way, are subjected to the operation known per se in the textile industry for the manufacture of threads, either in the simple twisting device 7 or in the doubling device 7a, in which several individual threads are twisted together into a thicker combined thread. Several strips may also be laid upon one another and these strips be spun together into one single combined thread.

The finished products are then subsequently treated as described above, for example tanned, in the vessel 8, and are thereafter dried in the device 9.

What I claim is:—

1. In a process for the manufacture of bands, for use in the production of membranes from collagenous or elastin-containing animal fibres, the steps of subjecting animal matter consisting of bundles of fibers bound together by protein material first to a treatment to loosen the coherence between the individual fibers of the bundles by means of protein softening solutions while substantially maintaining the fiber bundles as a whole, and thereafter pressing the loosened fiber bundles into bands.

2. In a process for the manufacture of bands, for use in the production of membranes from collagenous or elastin-containing animal fibres, the steps of subjecting animal matter consisting of bundles of fibers bound together by protein material first to a treatment to loosen the coherence between the individual fibers of the bundles by means of protein softening solutions while substantially maintaining the fiber bundles as a whole, and thereafter pressing the loosened fiber bundles into bands, then so superimposing a plurality of said bands of material that the fibres of one band are disposed at an angle to the fibres in the band immediately below or above and pressing the several bands together.

3. In a process for the manufacture of bands from collagenous or elastin-containing animal fibres the steps of subjecting animal matter consisting of bundles of fibers bound together by protein material first to a treatment to loosen the coherence between the individual fibers of the bundles by means of protein softening solutions while substantially maintaining the fiber bundles as a whole, and thereafter pressing the loosened fiber bundles into sheets and superimposing a plurality of said sheets so that they overlap one another and pressing the entire mass into a band.

4. In a process for the manufacture of threads from collagenous or elastin-containing animal fibres the steps of subjecting animal matter consisting of bundles of fibers first to a treatment to loosen the coherence between the individual fibers of the bundles by means of solutions while substantially maintaining the fiber bundles as a whole, and thereafter pressing the loosened fiber bundles into bands, dividing said bands into strips and twisting the resulting strips into threads.

5. In a process for the manufacture of threads from collagenous or elastin-containing animal fibres the steps of subjecting animal matter consisting of bundles of fibers first to a treatment to loosen the coherence between the individual fibers of the bundles by means of solutions while substantially maintaining the fiber bundles as a whole, and thereafter pressing the loosened fiber bundles into bands, subjecting the said bands to slight drying followed by pressing, dividing said bands into strips and twisting the resulting strips into threads.

6. A process for producing bands of collagenous or elastin-containing material, comprising subjecting animal sinews, composed of bundles of fibers bound together by proteins, to the action of a protein softening reagent to loosen the fibers without disintegration of the fiber bundles, and pressing the so-treated sinews into flat bands.

7. A process for producing threads of collagenous or elastin-containing material, comprising subjecting animal sinews, composed of bundles of fibers bound together by proteins, to the action of a protein softening reagent, pressing the so-treated sinews into flat bands, dividing said bands into strips, and twisting the resulting strips into threads.

8. A process for producing bands of collagenous or elastin-containing material, comprising subjecting animal sinews, composed of bundles of fibers bound together by proteins, to the action of a protein softening reagent having an acid reaction to loosen the fibers without disintegration of the fiber bundles, and pressing the so-treated sinews into flat bands.

9. A process for producing bands of collagenous or elastin-containing material, comprising subjecting animal sinews, composed of bundles of fibers bound together by proteins, to the action of a protein softening reagent to loosen the fibers without disintegration of the fiber bundles, partially drying the so-treated sinews, and pressing them into flat bands.

10. A process for producing bands of collagenous or elastin-containing material, comprising subjecting animal sinews, composed of bundles of fibers bound together by proteins, to the action of a protein softening reagent to loosen the fibers without disintegration of the fiber bundles, partially drying the sinews to reduce the liquid content to about 30 to 40%, and pressing the so-treated sinews into flat bands.

11. A process for producing bands of collagenous or elastin-containing material, comprising subjecting animal sinews, composed of bundles of fibers bound together by proteins, to the action of a protein softening reagent to loosen the fibers without disintegration of the fiber bundles, centrifuging the so-treated sinews to reduce the liquid content, and pressing them into flat bands.

12. A process for producing bands of collagenous or elastin-containing material, comprising subjecting animal sinews, composed of bundles of fibers bound together by proteins, to the action of a protein softening reagent to loosen the fibers without disintegration of the fiber bundles, heating the so-treated sinews to partially dry them, and then pressing the so-treated sinews into flat bands.

WILHELM SCHULTE.